US00RE34876E

United States Patent [19]

Adiwinata

[11] E Patent Number: Re. 34,876

[45] Reissued Date of Patent: Mar. 14, 1995

[54] ROTARY INTERNAL COMBUSTION ENGINE

[76] Inventor: Sofyan Adiwinata, Jalan Keblan 7 No. 3, Jakarta, Selatan, Indonesia

[21] Appl. No.: 157,289

[22] Filed: Nov. 26, 1993

Related U.S. Patent Documents

Reissue of:

[64] Patent No.: 5,067,883
Issued: Nov. 26, 1991
Appl. No.: 546,688
Filed: Jul. 2, 1990

U.S. Applications:

[63] Continuation of Ser. No. 239,688, Sep. 2, 1988, abandoned, which is a continuation-in-part of Ser. No. 98,189, Sep. 17, 1987, abandoned.

[30] Foreign Application Priority Data

Sep. 17, 1987 [EP] European Pat. Off. ..... 87201763.7

[51] Int. Cl.[6] ..... F01C 1/22; F04C 2/22
[52] U.S. Cl. ..... 418/61.2; 418/54
[58] Field of Search ..... 123/242; 418/61.2, 54

[56] References Cited

U.S. PATENT DOCUMENTS 3,208,666 9/1965 Fezer et al. ..... 418/61.2 X
3,244,155 4/1966 Laudet .
3,268,156 8/1966 Radziwill ..... 418/61.2
4,120,620 10/1978 Campos et al. ..... 418/61.2
4,308,002 12/1981 DiStefano ..... 418/62.1 X
4,400,145 8/1983 Hoffman ..... 418/61.2
5,067,883 11/1991 Adiwinata .

FOREIGN PATENT DOCUMENTS 0262721 4/1988 European Pat. Off. .
1115267 10/1961 Germany ..... 418/57
1194636 6/1965 Germany .
1426024 5/1969 Germany ..... 418/61.2
2853930 6/1980 Germany .
2095334 9/1982 United Kingdom ..... 418/61.2

*Primary Examiner*—Michael Koczo
*Attorney, Agent, or Firm*—Antonelli, Terry, Stout & Kraus

[57] ABSTRACT

A rotary internal combustion engine which principally consists of a two, three or four, either radially curved or flat, apex rotor and a radially arcaded or curved epicyclic or two or three lobed epitrochoid housing cavity, in which construction such rotary engine, the rotor has its rotations integrated with the rotations of the main crankshaft through the intermeshing gears by which the rotor will be rotated in accordance to its specific basic speed ratio so thereafter the rotor rotates with an effective clearance during all relative rotations and therefore is able to maintain such permanent distance between the housing and the rotor.

1 Claim, 14 Drawing Sheets

II-II I-I

ROTARY INTERNAL COMBUSTION ENGINE

Matter enclosed in heavy brackets [ ] appears in the original patent but forms no part of this reissue specification; matter printed in italics indicates the additions made by reissue.

This application is a continuation application of application Ser. No. 239,688, filed Sep. 2, 1988, and now abandoned, which in turn, is a continuation-in-part of application Ser. No. 098,189, filed on Sep. 17, 1987, and now abandoned.

This invention relates broadly to the art of ROTARY MECHANISMS and more particularly relates to the art of ROTARY INTERNAL COMBUSTION ENGINES, including all types of vehicles and equipments or apparatus provided with Rotary Internal Combustion Engines, and or Rotary Equipments/Machines such as Rotary Compressors, Rotary Pumps, Rotary Cutting Tools, or lathes as well as Rotary System for Aircraft Engines, or any future flying craft, using any kind of fuels suitable for such Rotary Internal Combustion Engines, either for land, sea or air transportations, and for other special purposes, which hereinafter for the purpose of simplicity will be referred to as ROTARY ENGINE.

BACKGROUND OF THE INVENTION

Rotary engines of the above mentioned type are comprised of an outer component having axially spaced end walls and a periphery curved or parallel to the axis and an inner component having axially spaced end surfaces and a periphery curved or parallel to the axis, which components hereafter for simplicity will be referred to as the housing and the rotor which housing defines a cavity having an epicyclic shape for a two apex rotor or in the shape of a two lobed epitrochoidal cavity housing for a three apex rotor.

Normally in such a rotary engine, there is an internal ring gear which is eccentrically mounted on the main crankshaft. The internal ring gear is fixed or secured within one side of the rotor and intermeshed to a pinion gear having a hollow shaft for free wheeling within the said main crankshaft. Particularly for a rotary engine with a three apex rotor the gearing ratio of the internal ring gear: pinion gear is fixed at 3:2 for which thereafter the pinion has to be fixed or secured to the housing frame. Such gearing ratio as mentioned above therefore will limit the diameter size of the main crankshaft due to the given eccentricity of such design.

Such fixing of the pinion as mentioned above to the housing frame kinematically will cause the power transmitted to be dependent on the strength of the cavity wall against the strong pressures of the rotor which receives the powerful impact as caused by the expanding gases soon after every ignition/combustion, particularly during extreme conditions when the engine is in operations. Sooner or later such conditions will cause an excessively heavy wear along the contact lines between the cavity wall and the rotor, which in the end will of course shorten the life or durability of the said engines.

Such rotor having axially spaced end surfaces and a peripheral wall parallel to the axis which hereafter for the purpose of simplicity will be referred to as the rotor with flat outer surface or flat rotor, will cause what is called "corner seal leakage" which is considered as one of the most serious problems to be solved due to is geometrical conditions.

By such limited size of the main crankshaft, fixing the pinion gear to the housing frame, and corner sealing, the whole performance of this typical rotary engine has been characterized by widely known, relatively low efficiency, high fuel consumption, high emissions and excessive wearing etc.

SUMMARY OF THE INVENTION

The objects of the present invention are to provide a new system for eliminating all said above low performances by using a larger pinion gear, to allow a larger diameter size of main crankshaft rotating the said pinion gear to allow direct power transmission to the main crankshaft and therefore avoiding the excessive wear along the contact lines between the rotor and the cavity wall, and by using radially curved apex rotor portions as well as a radially arcaded housing cavity wall, between which will be inserted suitable sealing elements which are able to eliminate the corner sealing problems which occur in the conventional models.

Those mentioned above objects are achieved by the rotary engine of the invention which instead of installing intermeshing gears as described in applicant's previous applications (European Patent application No. 87.201780.1 and U.S. patent application Ser. No. 098,189, now abandoned in favor of continuation application Ser. No. 07/349,873) a planetary gears system or epicyclic gears train will be installed between the rotor and the main crankshaft to secure and fix the speed ratio of 1.3 or 1.2 as required in order to maintain the permanent and stable or constant clearance between the rotor and the housing cavity wall during all relative rotations. Such permanent, stable or constant clearance as mentioned above will avoid any direct contact of the rotor to the housing cavity wall particularly during extreme condition of engine operation.

In such preferred embodiment, the arms of the planetary gears system or epicyclic gears train will be constructed integral to the pinion gear so therefore the planetary gears system is able to control the speed ratio of the rotor and the main crankshaft to 1:2 for a two apex rotor with an epicyclic housing cavity and 1:3 for a three apex rotor with two lobed epitrochoid housing cavity. Unlike the conventional design, in which the pinion gear is fixed and secured to the housing frame and therefore the pinion will always stay at its stationary positions in this invention the pinion will rotate or is rotated according to an intercorrelation speed among the gears, and therefore will be able to prevent any possibilities that a strong dynamic force during any extreme condition may cause the rotor to press the cavity wall in order to transmit the power to the main crankshaft of the engine, which of course would cause the wearing. The pinion rotation is fixed to a fractional figure of $\frac{1}{4}$ for a two apex rotor and 1/9 for a three apex rotor, which means that the pinion will rotate or is rotated up to 90° for every 360° main crankshaft rotation of the two apex rotor engine and up to 40° for every 360° main crankshaft rotation of the three apex rotor engine, by which rotation thereafter the rotor will obtain its proper speed. Based on the said above constructions therefore is it now made possible to use a larger internal ring gear which will be fixed or secured to one side of the rotor. Such ring gear as mentioned above for the two apex rotor will be constructed to a gearing ratio of 3:2 with its intermeshing pinion gear, and for the three apex rotor will be constructed to a gearing ratio of 4:3 with its intermeshing pinion gear, which based on said above gearing ratio thereafter it is possible to use a larger size of main crankshaft diameter for better and stronger performances. Based on the above-mentioned constructions, it is therefore made possible to use when necessary such i.e. for internal combustion engines, a radially curved apex rotor portion with a curved shape which extends continuously from one to an adjacent apex and which curved shape becomes minimal in the middle of said two adjacent apices. Such radially curved apex rotor shape is not necessary if such construction is used for compressors, pumps, cutting tools, etc.

In the case of internal combustion engines, within the outer surface of the said radial curve of the three apex rotor will be constructed a channel between each of the two adjacent curved apices in order to obtain the proper compression ration as may be required by the manufacturer, while within each radially curved apex portion of the rotor there will be provided sufficient grooves for suitable rings or sealing element installation seats i.e. such as beveled or normal grooves. If so desired, such channels used in the case of a three apex rotor engine, need not be used for the two apex rotor engine's construction, because for the same purpose, the curve of the two apex rotor outer surface can be adjusted to provide a suitable compression ration.

It is further object of the invention that particularly the two apex rotor engines will be provided with inlet and exhaust valves driven by one or more cam shafts having a speed ratio of 1:4 against the main crankshaft rotations. Accordingly, because such an effective clearance between the cooperating shapes of the radially curved apex rotor and the radially arcaded housing cavity wall is now made possible, by the invention, which clearance is constantly and permanently maintained during all relative rotations of the rotor, the said sealing element will function properly and prevent any leakage of the compression from one working chamber into another working chamber as a result of its own spring power, which therefore can maintain the permissible normal wearing rate for durability of such engines. In connection with the said above matter, the invention contemplates the use of a chrome plated inner radially arcaded housing cavity wall as well as for the sealing rings, for the purpose of obtaining smooth and hard chromed surfaces which have a good affinity for lubricating oil and which reduce the sealing ring wearing rate significantly.

Particularly for the three apex rotor, the present invention has a further object to provide that either a curved or flat rotor, instead of being constructed to have three apices with three lobed outer surfaces, is constructed to have three apices with six lobed outer surfaces. This construction will enable the said three ape rotor to fully wipe out completely the remaining volume of compressed fluid or gases into the outlet passage within the housing cavity and thereafter the same outer surfaces will receive a new volume of fluid or gases from the inlet passage adjacent to the mentioned above outlet passage to be brought forward into the suction chamber and compression chamber respectively.

When this construction of the invention is applied to internal combustion engines, the invention contemplates that the same channel a previously described will be constructed between each two adjacent apices for the purpose of adjusting the compression ratio as it may be required by manufacturer, which channel of course will still cause the remaining burned gases to be brought forward and mixed further with the new inserted air-fuel through the adjacent inlet passage.

It is further object of the invention that for rotary engines using either a two or three apex rotor, a planetary gears system or epicyclic gears train will be installed between the rotor and its main crankshaft.

The said planetary gears system or epicyclic gears train normally consist of three different gears such as the sun, the planet and the static outer ring gear. The sun gear is the gear in the center part of the system, while the planet is the intermeshed gear between the static ring gear and the said sun gear, and rotates in an opposite direction with respect to the main crankshaft and therefore enables the arm of the planet gears to rotate in the same direction as the main crankshaft. In these specific constructions, the invention contemplates that the arm of the planet gears will be constructed integral with the pinion gear which is intermeshed to the internal ring gear fixed within one side of the rotor, while the sun gear will be fixed or secured to the main crankshaft i.e. by such involute spline gear. By said above mentioned constructions therefore, the main crankshaft rotations are now integrated to the rotor's rotations and the gearing ratio is fixed to the proper required gearing ratio necessary to reach the speed ratio as previously mentioned, such as 1:2 for a two apex rotor and 1:3 for a three apex rotor. For the two apex rotor having an internal ring gear and its pinion based on a gearing ratio of 3:2, the suitable planetary gears system or epicyclic gears train will be constructed so that the sun, the planet and the static outer ring gear will be fixed according to the gearing ratio of 1:1:3.

By such construction therefore the arm of the planet gears will be rotated or rotates 90° per every 360° revolution of the main crankshaft.

For the three apex rotor having an internal ring gear and its pinion based on a gearing ratio of 4:3, the suitable planetary gears system or epicyclic gears train will be constructed so that the sun, the planet and the static outer ring gear will be fixed according to the gearing ratio of 1:1:8, so therefore the arm of the planet gears will be rotated or rotates 40° per 360° main crankshaft rotation. But because a gearing ratio of 1:8 between the sun and the static outer ring gear is not practical if constructed, therefore the invention contemplates that the planet gear as it may be required, instead of constructing it based on a gearing ratio of 1:1 with the sun gear of 1:8 with the static outer ring gear, in this matter will be constructed in a "cluster gear assembly" consisting of two integrated smaller and larger gears, of which the smaller is intermeshed to the ring gear based on ratio of 1:4, and the larger intermeshed to sun gear to the ratio 1:2. By such construction therefore, the arm of the planet gears will be rotated or rotates 40° per each 360° revolution of the main crankshaft.

Kinematically only one intermeshing gear is required as the planet gear but by using three gears, there will be more balance available and the loads can be equally divided among the gears and therefore will make possible the utilization of smaller and thinner gears for the system.

Therefore, the planetary gears system or epicyclic gears train as mentioned above has more advantages compared to the intermeshing gears, including particularly stable rotations, centering accuracy, simple constructions, etc.

It is a further object of the invention to provide that particularly for the radially curved apex rotor with radially arcaded housing cavity, the housing cavity construction will be made in two or more parts either crossing or parallel to the axis shaft depending on the variation as it may be necessary, provided with proper gasket or rubber of any other suitable sealing as to prevent any possibilities of compression leakage, cooling water leakage as well as any lubricating oil leakage from one working chamber into another.

In connection with the housing cavity construction either for the radially curved apex portion or flat surface rotor, the invention contemplates that in order to obtain the correct and precision shape which is the same as the outer envelope of the rotor bases on a speed ratio of 1:3 to the main crankshaft for the three apex rotor, or a speed ratio 1:2 to the main crankshaft for the two apex rotor, except for the permissible or allowed clearance as will be determined by the manufacturer, a special cutting tool which is constructed based on the same principles as the engine but provided with an accurate size cutting blade fixed or secured to the said tool, will be used to precisely cut and form the inner housing cavity.

Similar cutting tools, especially for a three apex rotor with six lobed outer surfaces, either of radially curved or flat type, are also made possible by using the same principles, but unlike the cutting tools for the housing cavity which cut while rotating to the proper speed ratio, the cutting tools for this typical rotor are constructed stationary.

For the preferred embodiment, the invention has further particular objects to provide the engines with the same gearing principles such as the gears for internal ring gear, the pinion, the intermeshing gears trains well as the planetary gear system or epicyclic gears trains, but to be based on different gearing ratio, which will be determined or result from the computation of the formula described in our previously submitted applications (European Patent application No. 87.20178.1 D and U.S. patent application Ser. No. 098,189, now abandoned in favor of continuation application Ser. No. 07/349,873) as follows:

$$\frac{\text{I.I.G.P.}}{\text{I.I.G.}} - \frac{a}{b} = P$$

in which

I.I.G.P. refers to the pitch diameter of the internal involute gear pinion.

I.I.G refers tot he pitch diameter of the internal involute gear.

a/b designates the additional rotation of the internal involute gear on each rotation of the main crankshaft, and P designates the basic ratio of the specific type of rotary engine, being $\frac{1}{2}$ for the rotary engine using a two apex rotor and epicyclic housing cavity, and $\frac{2}{3}$ for the rotary engine using a three apex rotor and a two lobed epitrochoid housing cavity.

In connection with the above mentioned formula, the invention contemplates that the gearing ratio of the intermeshing gears train can be determined based on computations as follows:

$$a/=\text{I.I.G.P.}/\text{I.I.G.}\times c/d\times elf$$

in which c/d and e/f designate the bearing ratio of the intermeshing gears, and in case more gears are required in order to obtain the right ratio, such computation can be extended to:

$$a/b=\text{I.I.G.P.}/\text{I.I.G.}\times c/d\times elf\times g/h$$

Further objects and features of the invention will be apparent from the following descriptions of the preferred embodiments with reference to the accompanying drawings.

BRIEF DESCRIPTION OF THE DRAWINGS

FIG. 1 is a longitudinal section view of the rotary engine having a radially curved two apex rotor, and a radially arcaded housing cavity and intermeshing gears in between.

DESCRIPTION OF THE PREFERRED EMBODIMENTS

Figure 1:
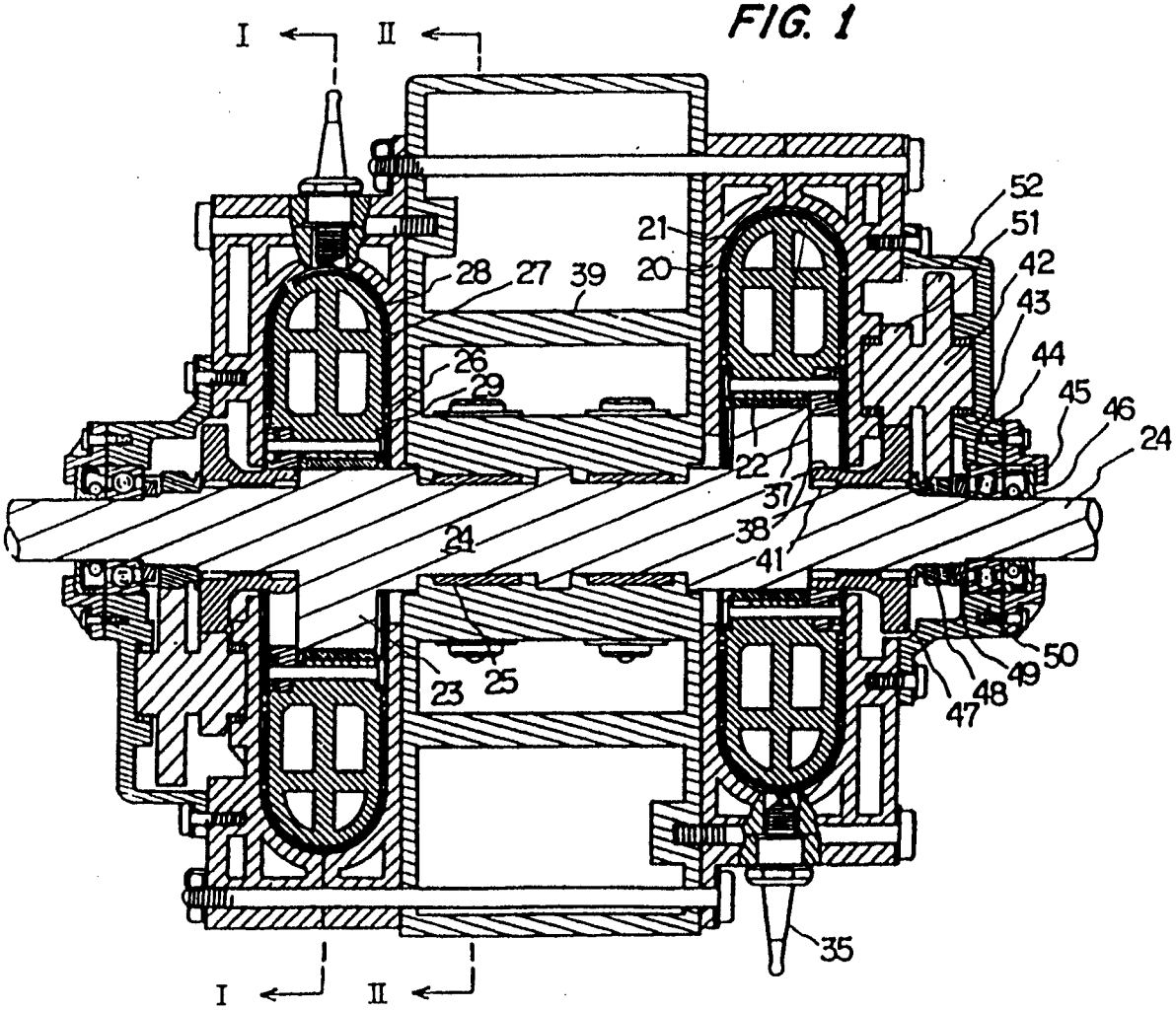
Figure 2:
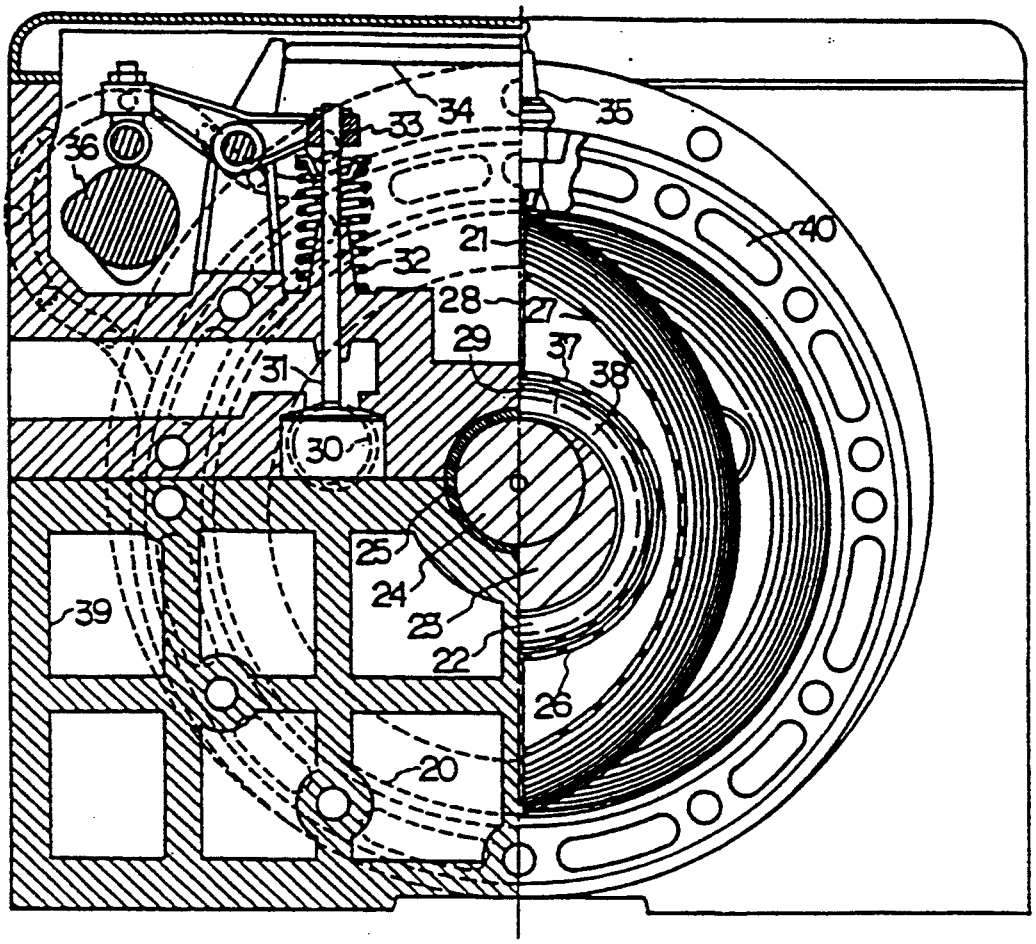
FIG. 2 is a cross sectional view, partly taken on the line I—I and partly taken on the line II—II of the FIG. 1.

Referring to FIGS. 1 and 2, a rotary internal combustion engine according to this invention is provided with two rotor units each having two radially curved apices 21 and being located within a curved housing cavity 20. The rotors are each mounted to an eccentric hubshaft 23 made and constructed integral with the main crankshaft 24, to have free wheeling by means of metal bearings 22 between the rotor and the eccentric hubshafts 23 and between the main crankshaft and the housing frame 25.

Each rotor is provided with side seal elements 27 which are connected with apex seal elements 28 and lubricating oil scraper rings 26 and 29. The curved housing cavity is provided with inlet and outlet passage 30 which are controlled by means of valves 31 supported by coil spring 32 and which valves are driven by means of camshaft 36 and rocker arms 33 and connecting rods 34.

The engine is also provided with ignitions by means of spark plugs 35 which are fixed or secured to the housing frame 20. The housing frame has a supporting main body which also functions as lube-oil tank 39.

For the cooling system, the housing frame is provided with cooling water passages 40 which are conventionally constructed.

Within one side of the rotor 21 there is fixed or secured an internal ring gear 37 which is intermeshed to a pinion gear 38 with a gearing ratio of 3:2. The pinion gear 38 is made or constructed in an integral cluster gears assembly with gear 47 having a hollow shaft for free wheeling around the main crankshaft 24 by means of roller bearings 41.

The gear 47 is intermeshed with a gear 51 which is made or constructed in another cluster gears assembly with the gear 52 having a separate shaft 42. The gearing ratio between gear 47 and 51 is fixed at 2:1.

Figure 3:
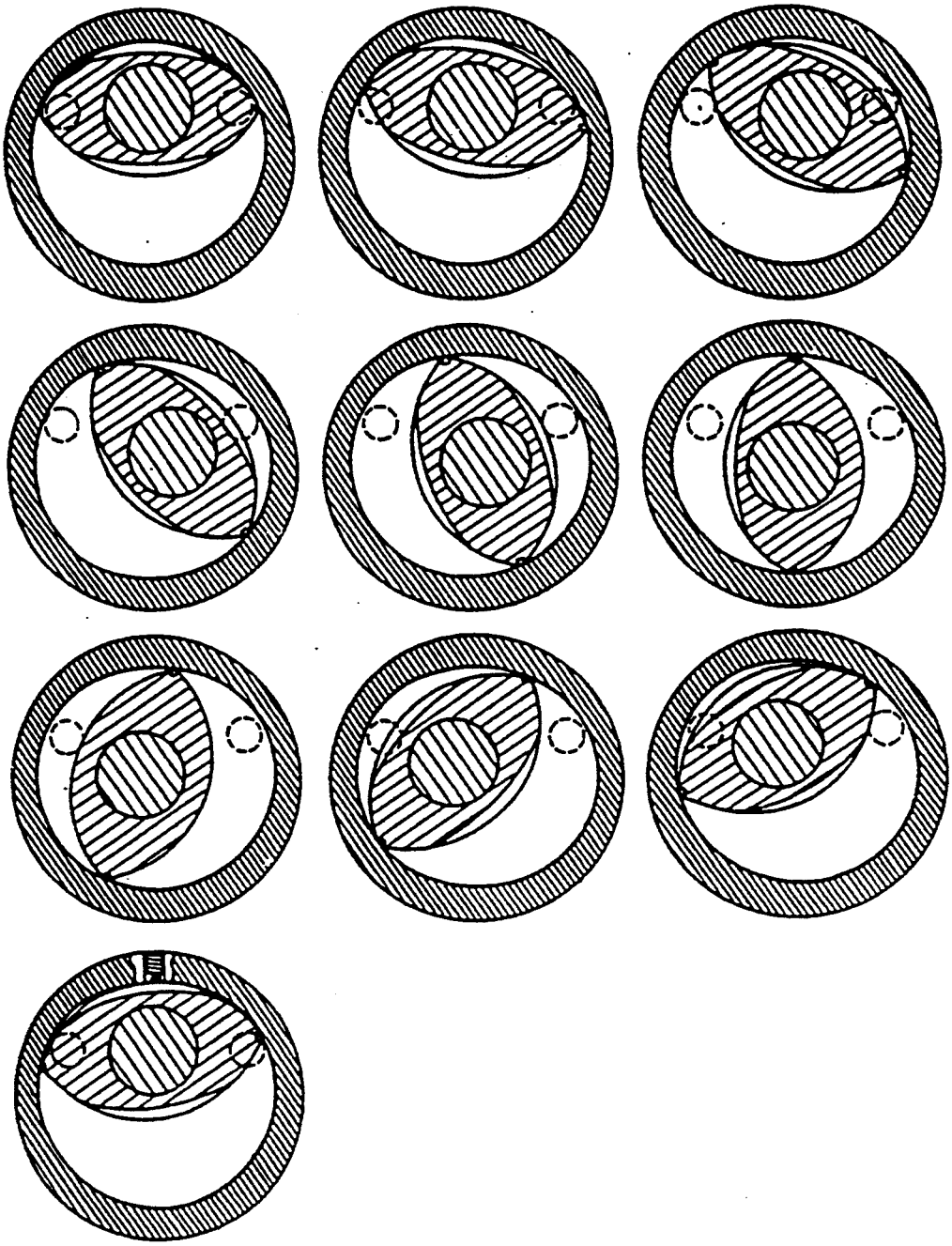
FIG. 3 are details illustrating motion of the two apex rotor with epicyclic housing.

The gear 52 is intermeshed to a final pinion gear 48 which is fixed or secured to the main crankshaft 24 by means of involute spline and strengthened by means of special locknut 49, and the gears 52 and 48 have a gearing ratio of 2:1. The cluster gears assembly shaft 42 is provided with a bearing 43 within which a end of the shaft is mounted to the housing frame 20 and gear cover 50. Both ends of the main crankshaft 24 are mounted with ball bearings 44, a lube-oil seal 46 and a seal cover 45 to prevent any lube-oil leakage out of the engine. As shown in the FIG. 3 the detailed motion of the rotor 21, within the housing cavity 20 is precisely drawn based on the speed ratio of 1:2 between the rotor and the main crankshaft 24.

The housing cavity 20 of an epicyclic form, and the permanent or constant clearance between the rotor apex 21 and the housing cavity 20 is therefore made possible by such constructions.

Figure 4:
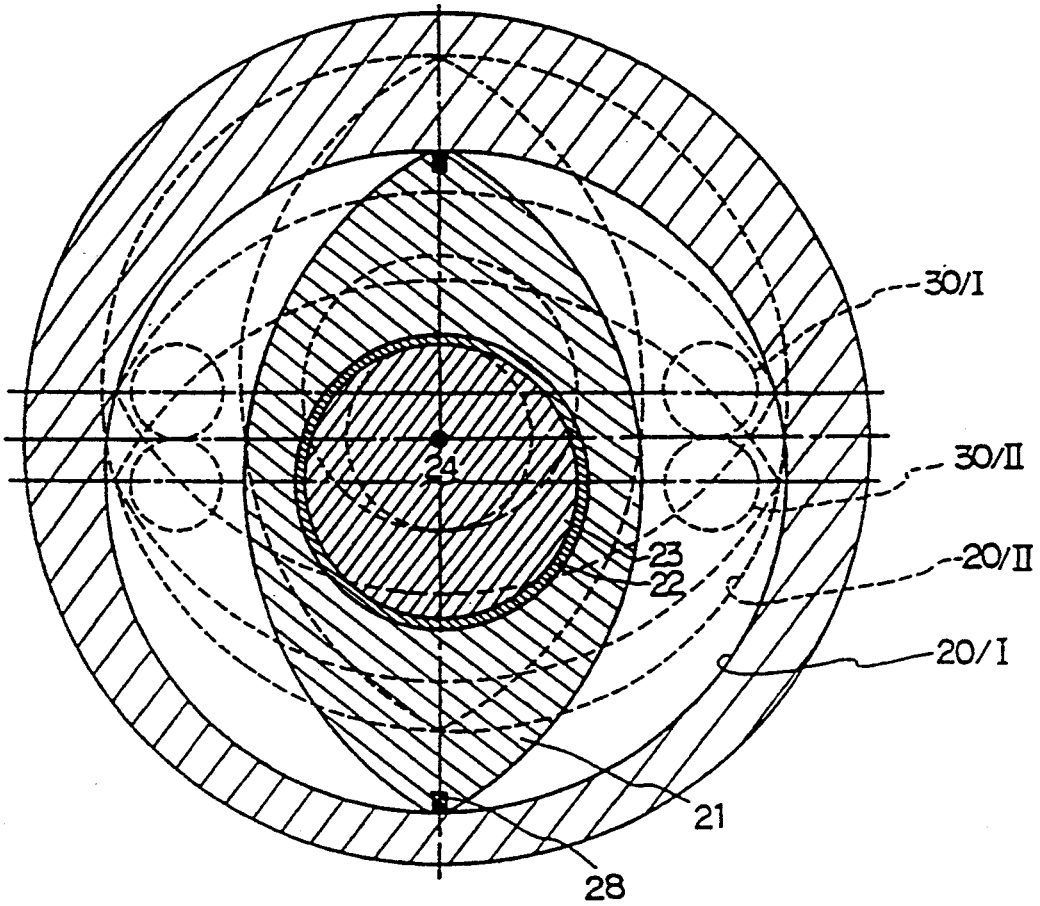
FIG. 4 shows the two units of a two apex rotor combined in one engine.

FIG. 4, shows the exact position of each rotor as drawn in the FIGS. 1 and 2, at the same time and at the eccentric hubshaft distance of 180° between each other.

In this particular design the front rotor 21 with apex sealing element 28 is mounted to the eccentric hubshaft 23 through bearings 22 with the main crankshaft 24 driving at a speed ratio of 1:2.

Because the rear eccentric hubshaft is positioned at a distance of 180° to the front eccentric hubshaft, for balanced rotations and ignitions the housing cavity of the rear part is constructed higher than the front part due to the given eccentricity.

Such condition will cause the inlet and outlet passages of the front part 30/1 to be relatively higher than the inlet and outlet passages of the rear part 30/II, while the rear housing cavity 20/II is relatively higher than the front housing cavity 20/I.

Figure 5:
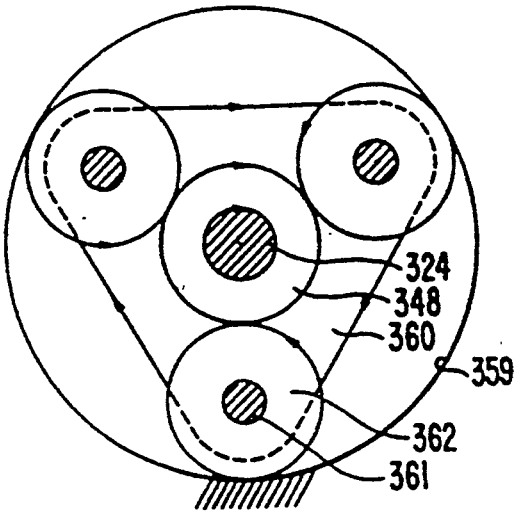
FIGS. 5 and 6 illustrate the planetary gears system applied to a rotary engine having a two curved apex rotor and a curved epicyclic housing cavity.
Figure 6:
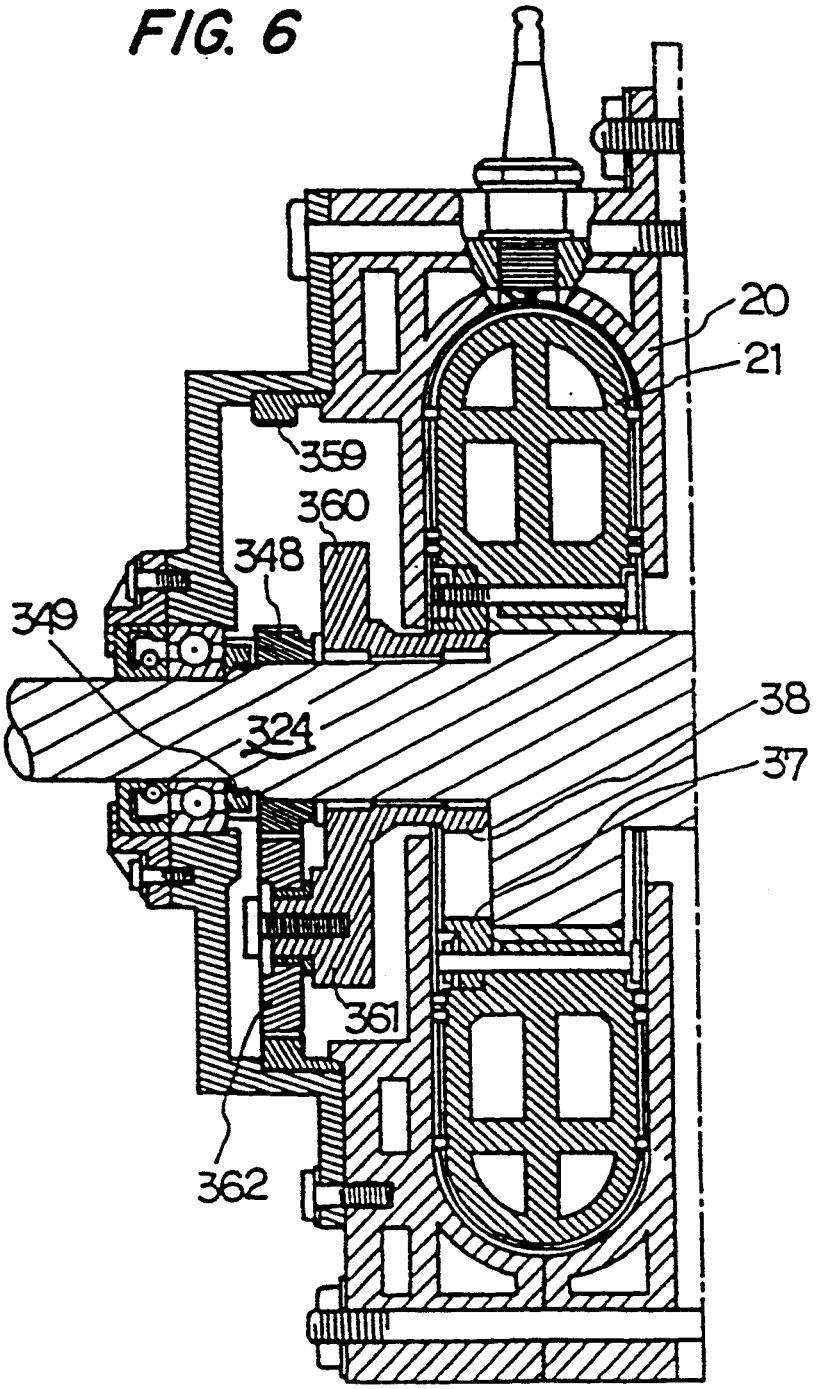

FIGS. 5 and 6 show the planetary gears system or epicyclic gears train used for the same radially curved two apex rotors 21 with radially arcaded housing cavity 20.

In this construction, the sun gear 348 which is fixed or secured to the main crankshaft 324, is intermeshed to three units of planet gears 362 which are each mounted to an armshaft 361 for free wheeling, based on a gearing ratio of 1:1.

The three units of planet gears 362 are also intermeshed to the outer ring gear 359 based on a gearing ratio of 1:3.

So therefore, because of the superposition of the planet gears, the reduction of the arm 360 speed ratio will be $1:(3/1+1)=1:4$ or equal to 90° per each 360° revolution of the main crankshaft. And by a gearing ratio of 2:3 between the pinion gear 38 and internal ring gear 37, the rotor 21 will be rotated or rotates up to $(1-\frac{2}{3})\times 360°=120°$. As the arm is integrated to the pinion by a gearing ratio of 2:3, the internal ring gear will be rotated or rotates to $\frac{2}{3}\times 90°=60°$ as additional rotation per each main crankshaft 360° rotation. By adding the additional rotation of 60° to its own rotation of 120° therefore the rotor 21 will have totally $120°+60°=180°$ per each 360° main crankshaft rotation, which is exactly according to the speed ratio of 1:2 as required by such two apex rotor and epicyclic housing cavity.

Figure 7:
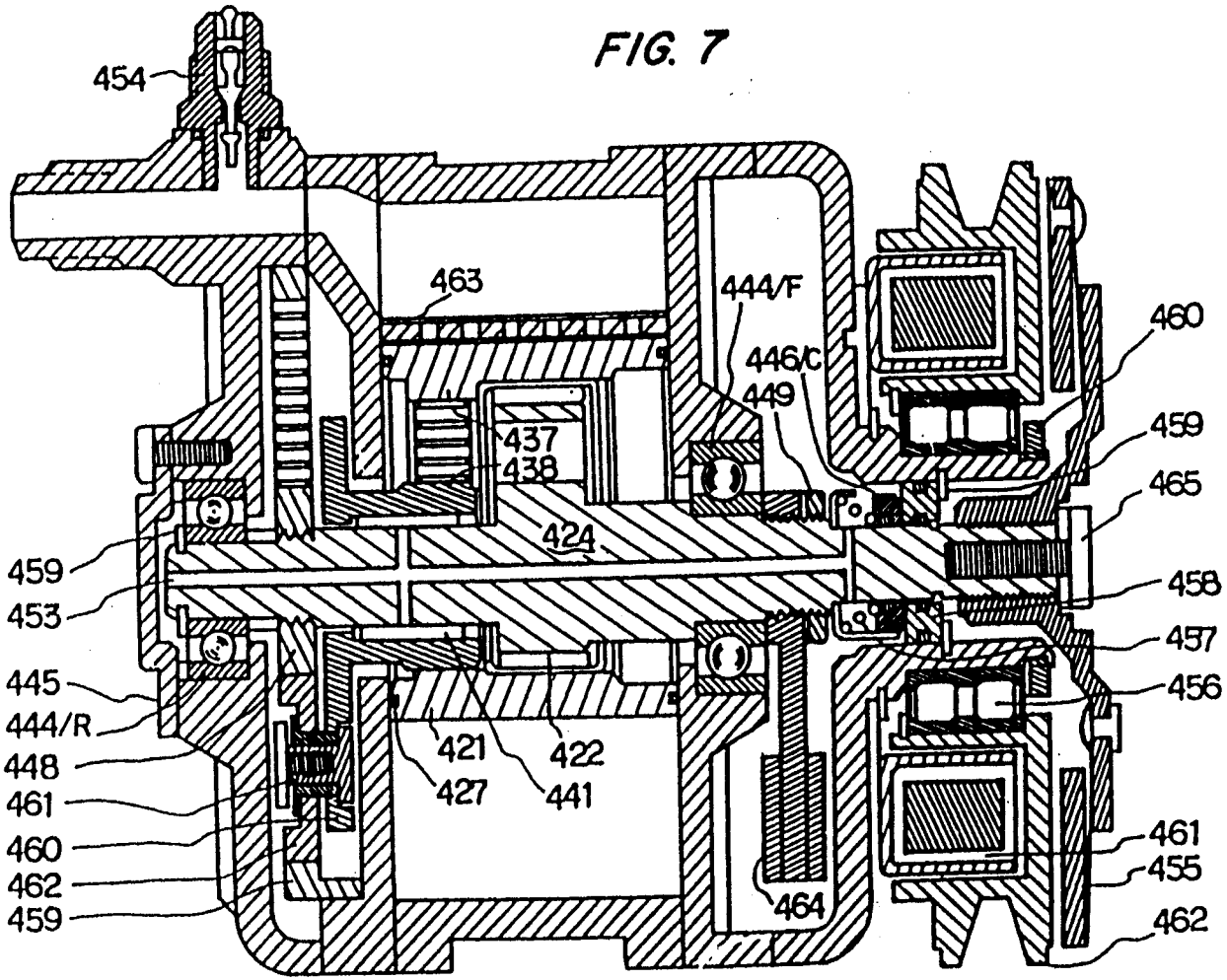
FIG. 7 is the longitudinal section view of a rotary compressor based on the invention principles, having planetary gears system applied for a two, flat apex rotor and epicyclic housing cavity, specially designed for a car air conditioning system.

FIG. 7 is a rotary compressor based on the invention principles and designed for a car air conditioning system to the actual size of 1:1 to show how small and effective the invention is for such particular purpose.

Such compressor is constructed to have a two apex rotor 421 with flat outer surfaces provided with proper sealing elements 427. Within the rotor 421 there is constructed from the same material as the rotor an integral internal ring gear 437 which is intermeshed to a pinion gear 348, based on a gearing ratio of 2:3.

Such rotor 421 is mounted to an eccentric hubshaft made integrally with the main crankshaft 424, for free wheeling through a roller bearing 422 installed therebetween.

The pinion gear 438 is made integral with the arm of planet gears 460 which are constructed to hold an armshaft 461 where planet gears 462 will free wheel around.

The sun gear is fixed or secured to the main crankshaft by means of an involute spline and intermeshed to the three units or planet gears based on a gearing ratio of 1:1. The three units of planet gears are also intermeshed to an outer ring gear 459 which is fixed and secured to the housing frame.

By such construction therefore the arm will be rotated or rotates 90° per each revolution of the main crankshaft 424, so that the rotor will rotate 60° additional rotation per each revolution of the main crankshaft in order to obtain a speed ratio of 1:2.

The main crankshaft 424 is also provided with lubricating oil holes 453 through the center for sufficient lubrication of a roller bearing 441 which is installed within the hollow shaft of the pinion gear 438, and also to lubricate a rotating seal assembly formed of a coil spring 457, a carbon seal 446/C, a stationary seal seat and rubber gasket 458, and a retaining ring 459. Both sides of the main crankshaft 424 are respectively, firmly mounted to a front ball bearing 444/F and a rear ball bearing 444/R with a snap ring 459'. The opening in the engine which receives the crankshaft 424 is closed by end cover 445 after sufficient special lub-oil is provided therein. In a front part of the engine a balance counterweight 464 is fixed and secured to the main crankshaft 424 by means of a locknut 449.

Within the outer part of the housing there is fixed a magnetic field coil 471, and a free wheeling pulley seat assembly 472 which is positioned on a cylindrical roller bearing 456 to cooperate with a clutch assembly 455.

The cylindrical roller bearing is fixed and secured to the housing frame by means of a special locknut 460, while the clutch assembly is fixed and secured to the main crankshaft 424 by means of a front hexagonal nut 465.

In the rear part, the compressor is provided with schrader 454 and within the inside part thereof there is installed a cylindrical plate valve 463.

Figure 8:
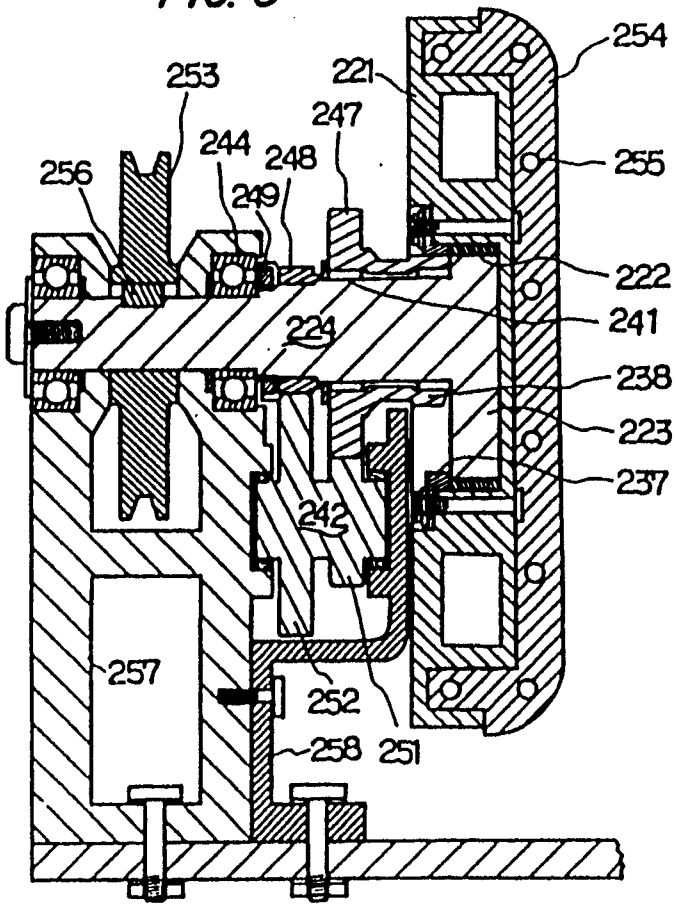
FIG. 8 is the longitudinal section view of the special cutting tools to shape the housing cavity.

FIG. 8 shows a special cutting tool made for the purpose of cutting or precisely shaping the radially arcaded housing cavity or flat inner surface either for a two apex rotor or a three apex rotor.

Such equipment according to the invention includes a rotor 221 provided with a cutting blade of the same shape as the desired housing cavity. The cutting blade 254 is fixed or secured by means of bolt and nut 255. The rotor 221 is mounted to the eccentric hubshaft 223 which is integral with the main crankshaft 224, and rotated to the speed ratio of 1:2 for the two apex rotor or a speed ratio of 1:3 for the three apex rotor, by means of intermeshing gears 237 and 238, 247 and 251, 252 and 248, in such a way in accordance to each gearing ratio as it may be required for each type of engine.

In such a construction the main crankshaft 224 is held by two ball bearings 244 which in the front part are connected to a pinion locknut 249 and at the rear are closed by a hex nut.

To drive the cutting tools a pulley 253 is installed in between the two bearings and fixed to the main crankshaft 224 by means of inserted key 256. The ball bearings are positioned to the sides of the main frame 257 which is also constructed to accommodate on side of the separate hubshaft of the cluster gears assembly 242. The other side of hubshaft 242 is supported by a special separate stand 258 which is fixed or secured to the main frame by means of bolts and nuts.

Figure 9:
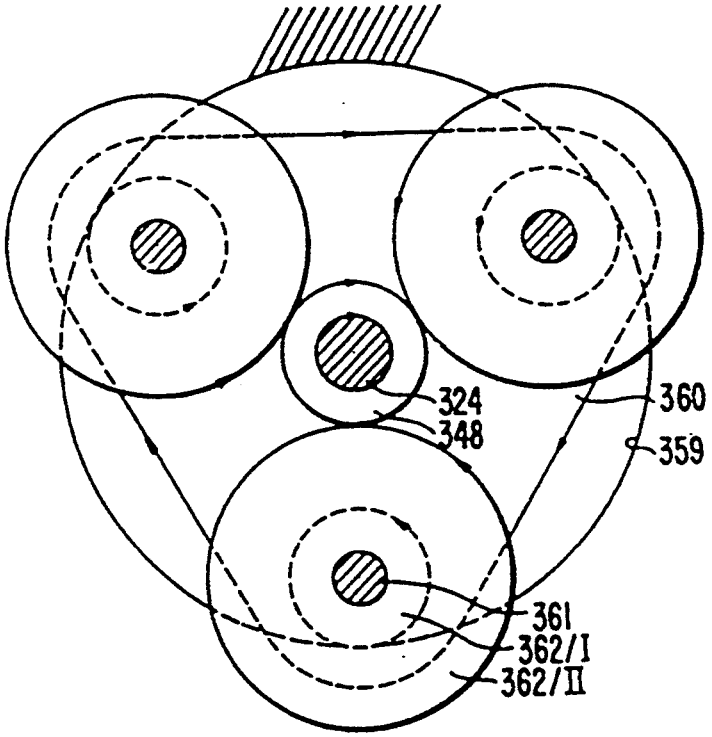
FIGS. 9 and 10 are respectively a schematic side view and an axial cross sectional view of the planetary gears system applied to a rotary engine having a three, curved apex rotor and a curved two lobed epitrochoid housing cavity.
Figure 10:
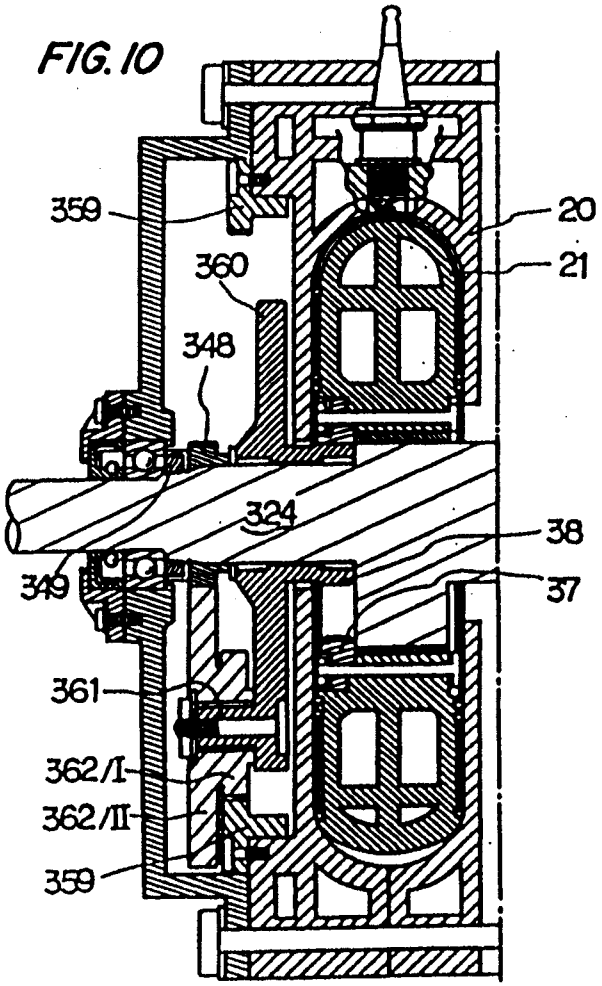

FIGS. 9 and 10 are the drawings of the planetary gears system applied to the rotary engine having a curved three apex rotor 21 and a two lobed curved epitrochoid housing cavity 20. The planet gears according to this invention are constructed in a cluster gears assembly consisting of a smaller gear 362/I and a larger gear 362/II, which is intermeshed with sun gear 348 as well as to the outer ring gear 359 based on a gearing ratio between gear 348 and 362/II fixed at 1:2 and between gear 362/I and ring gear 359 fixed at 1:4. The said sun gear is fixed to the main crankshaft by means of involute spline and strengthened by means of special locknut 349.

Because of the superposition of the planet gears, therefore the arm 360 will be reduced in its speed to the ratio of 1:(2/1×4/1)30 1=1:9 or equal to 40° per, each 360° revolution of the main crankshaft.

By giving a ratio of 3.4 between pinion gear 38 and internal ring gear 37, therefore the rotor 21 will be rotated or rotates up to $(1\text{-}\frac{3}{4})33\ 360°=90°$, on each revolution of the main crankshaft. The rotation of the arm of 40° as mentioned above will cause the rotor to be given an additional rotation by pinion gear 38 up to $\frac{3}{4}\times 40°=30°$ per each revolution of the main crankshaft. Therefore by adding its own rotation of 90° with the said additional rotation of 30° the rotor will rotate to $90°+30°=120°$ per each revolution of the main crankshaft, which is exactly according to the speed ratio of 1:3 as required by such typical rotary engine having a three apex rotor and a two lobed epitochoid housing cavity.

Figure 11:
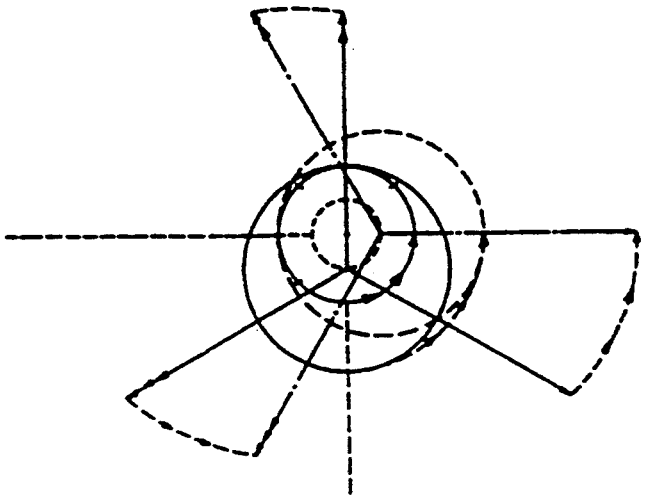
FIG. 11 is a schematic illustration of the rotations of the apex portion shown in the FIG. 12 based on the speed ratio of 1:3 to the main crankshaft.
Figure 12:
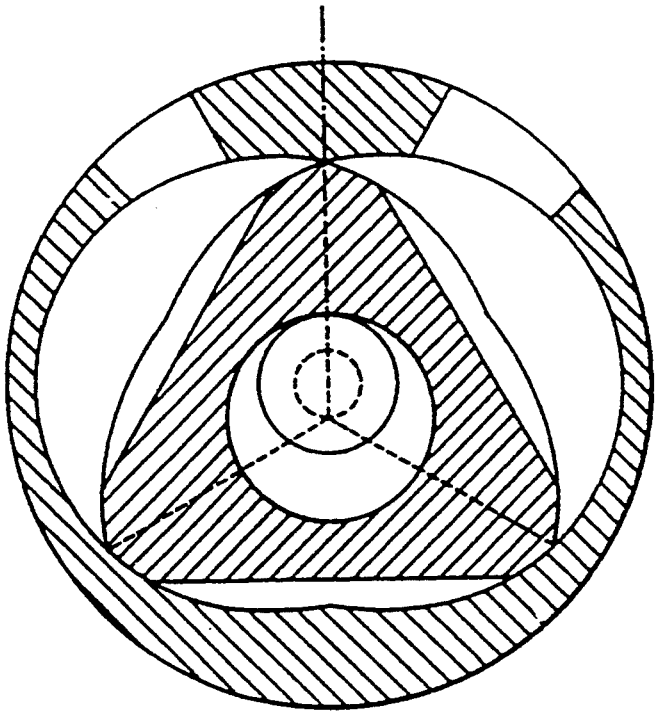
FIG. 12 is a cross sectional view of the rotary engine having a three apex rotor with six lobed outer surfaces and a two lobed epitrochoid housing cavity.

FIG. 12 is the drawing of the typical rotary engine having a three apex rotor with six lobed outer surfaces and a two lobed epitrochoid housing cavity. The rotor is fixed at a speed ratio of 1:3 with the main crankshaft which motion can be seen from FIG. 11.

By such construction it is now made possible to obtain a wider space within the apex portion to cooperate with the cavity wall for leakage prevention.

Figure 13:
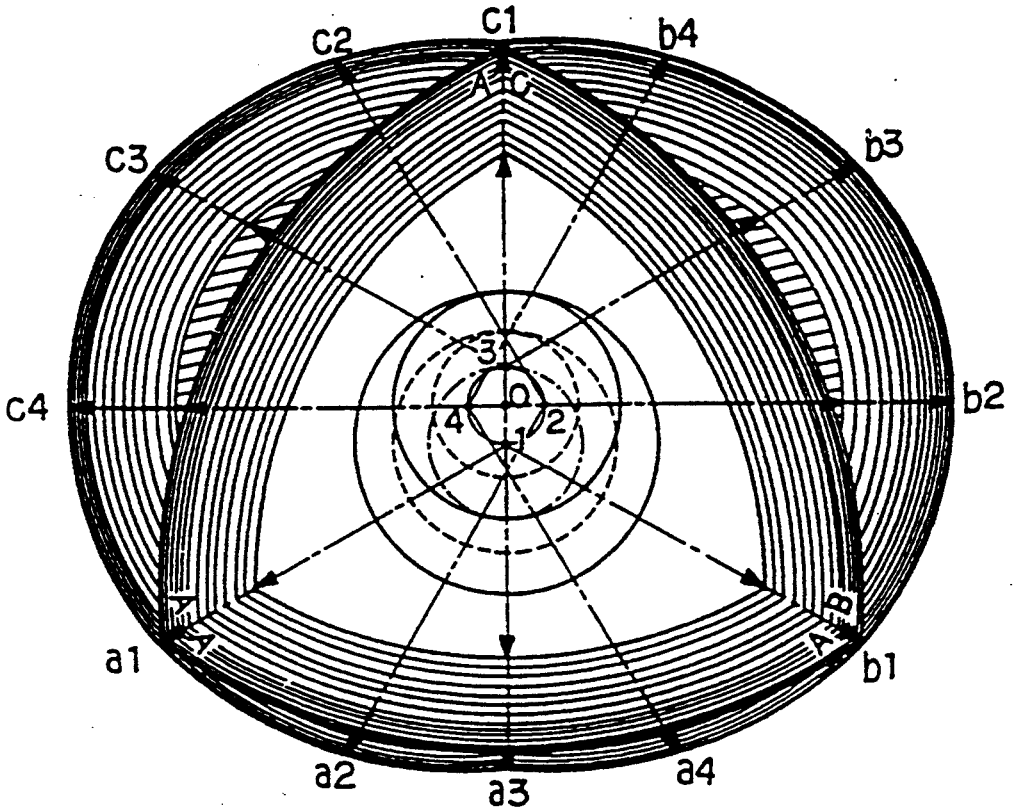
FIG 13 shows the exact positions of the curved apex portion of the rotor during all relative rotations based on the speed ratio of 1:3 to the main crankshaft.
Figure 14:
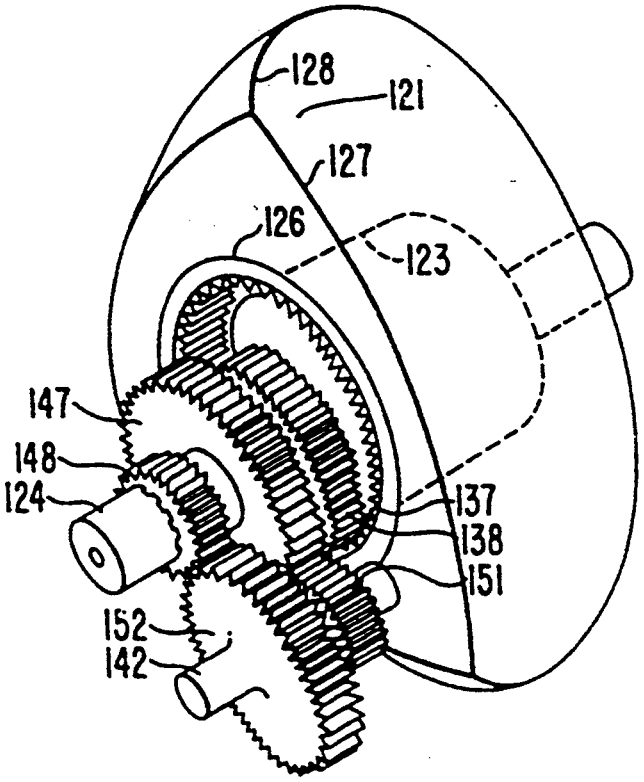
FIG. 14 is the perspective view of the radially curved three apex rotor provided with intermeshing gears system based on the principles of the invention.

FIG. 13 is an illustration of the exact position of the apex rotor at a speed ratio of 1:3. For the same size of rotor compared to the conventional design with stationary pinion gear fixed to the housing frame, this typical design has a shorter eccentricity as well as shorter horizontal length of line c4-b2 as shown in the FIG.13. FIG. 14 is a perspective drawing of the rotor provided with intermeshing gears in accordance with the invention.

Figure 15:
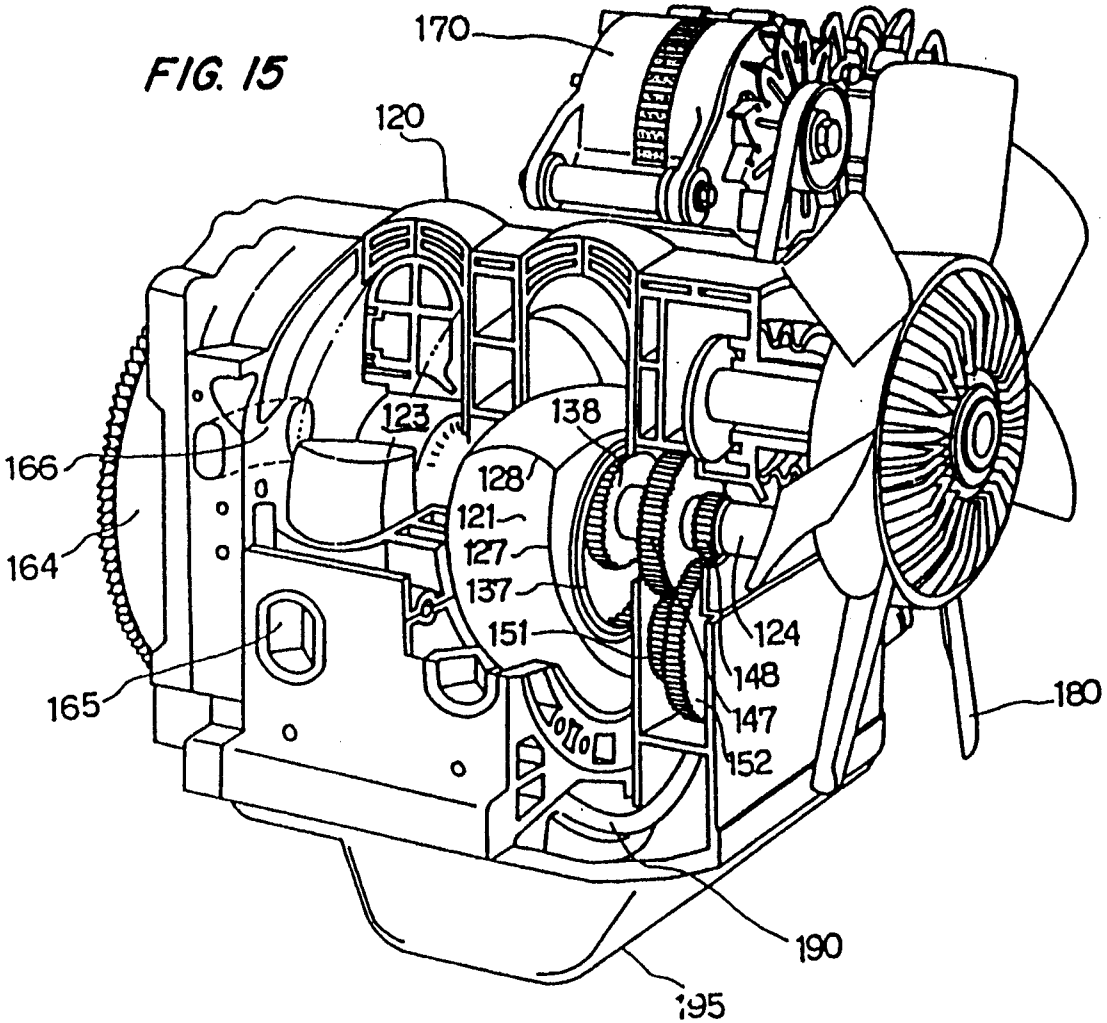
FIG. 15 is a perspective view of the whole engine unit with portions shown in silhouetted and broken away in which can be seen the radially curved three apex rotors (2 units) and their housing cavities based on the principles of the invention and provided with an intermeshing gears system.

FIG. 15 is a perspective drawing of the whole concept of the invention based on a silhouetted-broken away view to show the rotor 121, radial apex seal 128, curved housing 120, side seal elements 127, internal ring gear 137, pinion gear 138, the intermeshing gears 147, 148, 151 and 152, the main crankshaft 124 and eccentric hubshaft 123, flywheel 164, inlet passage 166, outlet passage 165 and lub oil tank 195, oil filter 190, cooling fan 180, electric generator 170, etc.

Figure 16A:
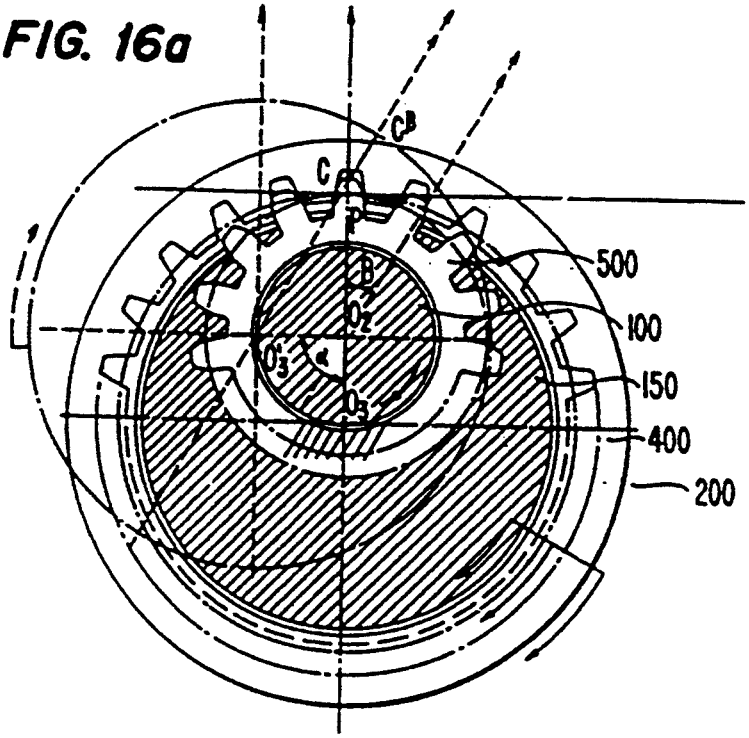
FIGS. 16, a, b, c, and d are the drawings of the relative motions of the related parts in accordance with the kinematic description of the invention.

FIGS. 16a, b, c and d are drawings for the following kinematic descriptions.

KINEMATICS OF THE INVENTION

FIGS 16a, b, c and d show the kinematic of the preferred embodiment of the invention, in which rotary engine, and I.I.G./Internal Involute Gear (400) is fixed to the rotor (200) and intermeshed to an I.I.G.P./Internal Involute Gear Pinion (500) having a hollow shaft, through which a M.C.S./Main Crankshaft (100) including its integral E.H./Eccentric Hub Shaft (150) will rotate freely.

Figure 16B:
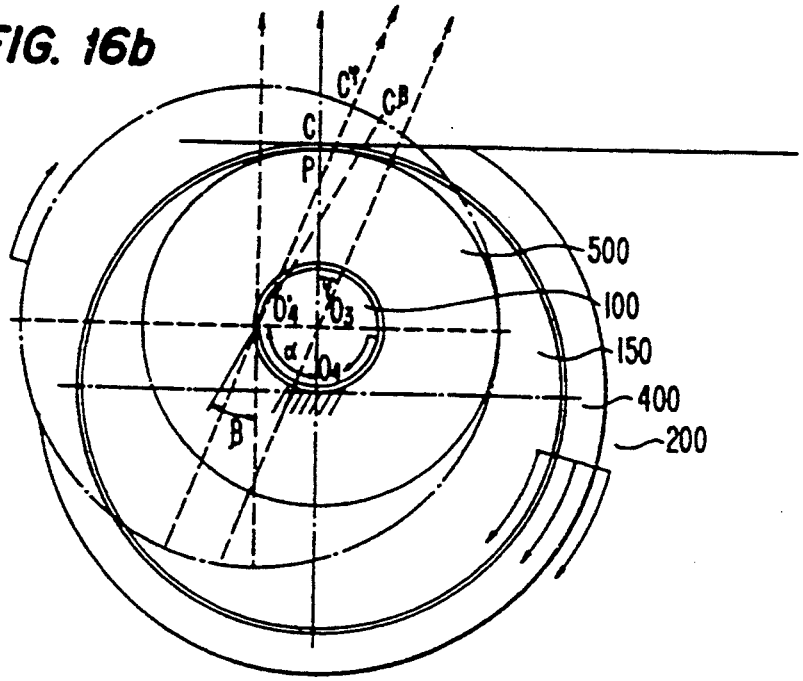
Figure 16C:
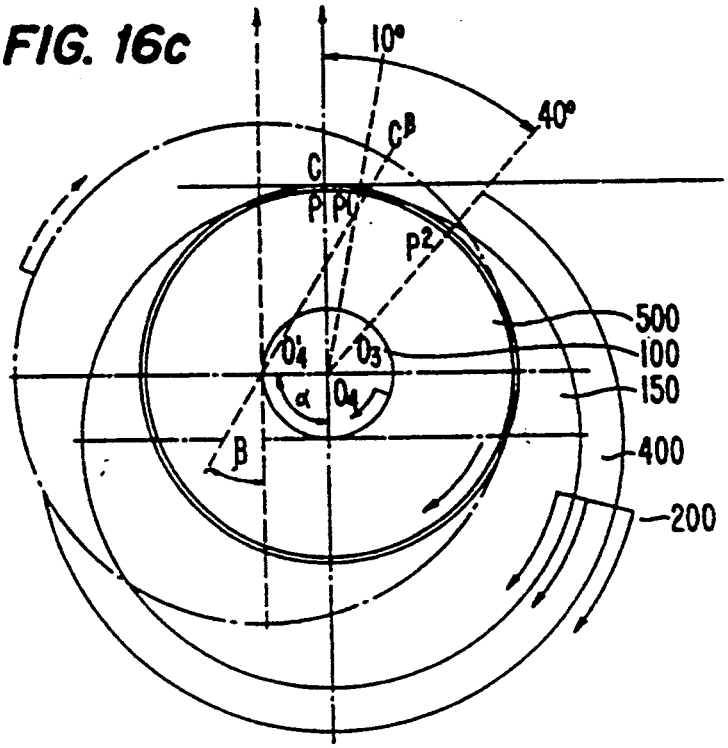

In FIG. 16C the I.I.G.P. (500) is intermeshed with an I.I.G. (400) based on a gearing ratio of 2:3. The I.I.G.P. (500) has a hollow shaft through which the M.C./S. (100) can rotate freely.

In such a case the I.I.G.P. (500) is fixed or secured to its housing frame as conventionally constructed.

Based on such gearing ratio of 2:3,therefore every revolution (360°) of the M.C.S. (100)/E.H.S. (150), the rotor (200)/I.I.G. (400) will be rotated or rotates to (1-172 )33 360°=120°, which means the speed ratio between the rotor (200)/I.I.G. (400) against the M.C.S. (100)/E.H.S.(150) is 120°:360°=1:3. The contact points of the both pitch circles are a point C which belongs to the pitch circle of I.I.G.(400) and a point P which belongs to the pitch circle of I.I.G.P. (500).

In FIG. 16a the M.C.S. (100)/E.H.S.(150) is rotated to 90° (a=90°) and therefore the center point of E.H.S. (150) which is O3 will move to $O3^1$.

Because the I.I.G.P. (500) is stationary therefore point P will still be at is original position while the point C will move to the new position of $C\beta(\beta=\frac{1}{3}\times\beta=30°)$.

In FIG. 16b, the I.I.G.P. (500) is intermeshed with I.I.G. (400) based on gearing ratio of 3:4 and the I.I.G.P. (500) is still fixed or secured to its housing frame. By such gearing ratio of 3:4, therefore with every revolution of M.C.S. (100)/E.H.S. (150) the rotor (200/I.I.G. (400) will be rotated or rotates to:$(1\text{-}\frac{3}{4})\times 360°=90°$, in this FIG. 16b, because the M.C.S. (100)/E.H.S. (150) is rotated only for 90°. Therefore point C will move to point Cϕ, and point P is still maintained in its original position ($\phi = \frac{1}{4} \times \beta 22.5°$).

But because the speed ratio of the rotor (100) must be maintained 1:3 if using a three apex portion rotor with a two lobed epitrochoid housing cavity, therefore the new position of point C must be in the point Cβ(Lβ=30°).

The distance between Cϕ and Cβ in this FIG. 16b can be reached only by the rotor (200)/I.I.G. (400) if during the said above rotation it is accelerated through the intermeshing gears installed between the rotor (200) and the M.C.S. (100) by which intermeshing gears, therefore the rotor (200) will always be able to reach in due time and the accurate position of Cβ; on each revolution as mentioned above. Such additional distance of Cϕ to Cβ if mentioned in fractional figures is designated as a/b in the Raser formula in the said application.

In FIG. 16b the distance of cϕ to Cβ is 30°−22.5°=7.5° per 90° of the shaft rotation. Therefore if calculated by a complete revolution of 360° the same said above distance will be (360°:90°)×7.5°=30° or represent 1/12 of the shaft revolution. Therefore in such a case as mentioned in FIG. 16b the a/b quotient is equal 1/12 which equation has been used and described in the previous Summary of the Invention of the previous application (E.P.O. No. 87.201780.1, U.S. patent Ser. No. 098,189). The said above a/b equation is designed for the purpose of maximum use of the space available and minimum bearing to be installed in the engine.

There are many variations in determining the gearing ratio for such same purpose but only few that can save the space and minimum gearing as mentioned above. If the Raser formula is not used to calculate the gearing as explained above, there is the possibility that the a/b quotient can not be met precisely by any combinations of gears installed, and therefore consequently will cause the outer envelope of the rotor's rotation to have a shape which is not exactly the same as the two lobed epitrochoid housing cavity and which will not be able to maintain the permanent clearance during all relative rotations between each apex portion of the rotor (200) and the housing wall (11). Such permanent clearance during all relative rotation is made possible only if the rotor (200) always maintains the speed ratio of 1:3 with its M.C.S. (100).

Furthermore the invention is also applicable to any other rotary type such as a two apex rotor or a four apex rotor, which for the purpose of simplicity the basic ratio for the specific type of rotary (such as $\frac{1}{2}$ for a two apex rotor, $\frac{2}{3}$ for a three apex rotor and $\frac{3}{4}$ for a four apex rotor, hereinafter will be designated or referred to as p respectively, as can be seen from the formula of this invention.

The intermeshing gears which are installed between the rotor (200)/I.I.G.(400) and the M.C.S. (100) will cause the I.I.G.P.(100) to rotate in the same direction in order that the point of Cϕ reaches the position of the point Cβ based on speed ratio of 1:2 for a two apex rotor or 1:3 for a three apex rotor or 3:4 for a four apex rotor.

Figure 16D:
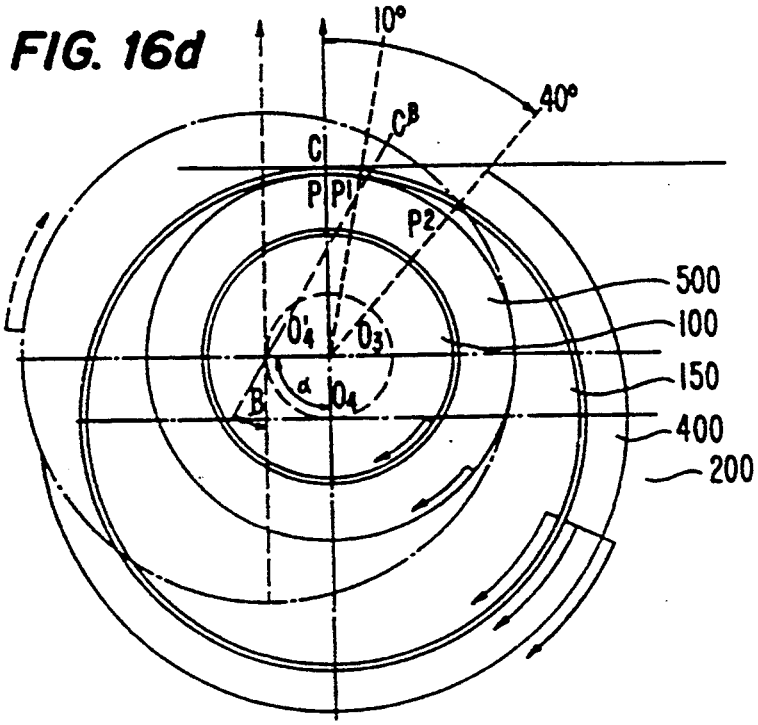

The movement of the I.I.G.P. (100) is shown in the FIGS. 16c and 16d. In FIG. 16c, the I.I.G.P. (500) is constructed in one hollow shaft with one of the intermeshing gears through which it will be rotated or rotates according to its proper speed ratio.

Because the a/b quotient of 1/12 represents for such rotary engine with I.I.G.P.(500) and I.I.G.(400) having a gearing ratio of 3:4, therefore the I.I.G.P.(500) will be rotated or rotates to the distance of:

$1/12 \times 4/3 \times 360° = 40°$ per each full revolution of the M.C.S.(100)/E.H.S.(150) or in fractional figure of 1/9.

Such fractional figure of 1 1/9 can be easily split into $\frac{1}{3} \times \frac{1}{3}$ which means that the further intermeshing gears between the I.I.G.P.(500) and M.C.S.(100) is fixed to gearing ratio of 1:3 and 1:3 respectively (minimum gears for space efficiency). In FIG. 16c because the M.C.S. (100) is rotated only for 90° therefore the new position of the P will be P1 which is 90°360°×40°=10° in the same direction and the actual P position after every full revolution will be P2 which is at 40° away from its original position.

In a rotary engine with a two apex rotor and a one epicyclic housing cavity the figure is $\frac{1}{4}$ which can be easily split into fixed gearing ratio of 1:2 and 1:2 respectively while in a three apex rotor with a four lobed epitrochoid housing it will be 1/16 which can be easily split into fixed gearing ratio of 1:4 and 1:4 respectively.

Because based on the above gearing ratio of 3:4 between the I.I.G.P. (500) and its intermeshing I.I.G. (400) the diameter of the M.C.S. (100) can be constructed larger than the conventional model.

Such larger M.C.S. (100) other than the conventional model can be seen from the FIG, 16d, by which, naturally the engine will be able to carry more loads etc.

What is claimed is:

1. A rotary engine comprising a housing cavity having an inner wall shape, as seen in a cross section perpendicular to a longitudinal axis of the cavity, in the form of a two lobed epitrochoidal shape and a three apex rotor installed within the said cavity and movable therearound in a planetary fashion, and a main crankshaft provided with an eccentric hubshaft supporting said rotor, said rotor and said housing cavity both being radially curved as seen in a cross section taken along the longitudinal axis of the cavity, and wherein the engine further comprises a transmission installed inbetween the rotor and the main crankshaft, said transmission having gears which comprise:

a. an internal ring gear which is fixed or secured to one side of the rotor;

b. a first cluster gears assembly having a hollow shaft for free wheeling with respect to said main crankshaft by means of roller bearings, a smaller gear which functions as a first pinion gear to the said internal ring gear, and a larger gear which is intermeshed to a second cluster gears assembly;

c. the second cluster gears assembly having a separate shaft and comprising a smaller gear which is intermeshed to the said larger gear of the first cluster gears assembly, and a larger gear which is intermeshed to a second pinion gear which is fixed to the main crankshaft; and wherein d. for the three apex rotor the internal ring gear and first pinion gear the gearing ratio is 4:3; and e. the gearing ratio of the larger gear of the first cluster gears assembly to the smaller gear of the second cluster gears assembly is 3:1, and the gearing ratio of the larger gear of the second cluster gears assembly to the second pinion gear is 3:1, whereby there is a minimum of gears for space efficiency.

* * * * *